May 19, 1959     J. W. HAAS ET AL     2,887,627
RECTIFIER AND METHOD OF MAKING THE SAME
Filed Jan. 9, 1953
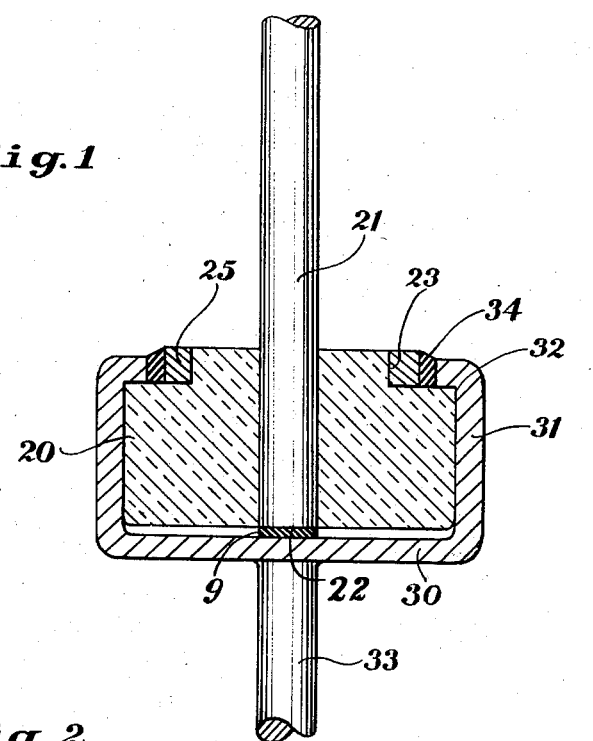
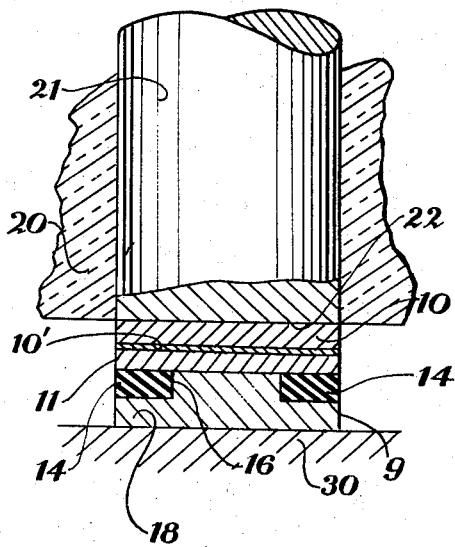
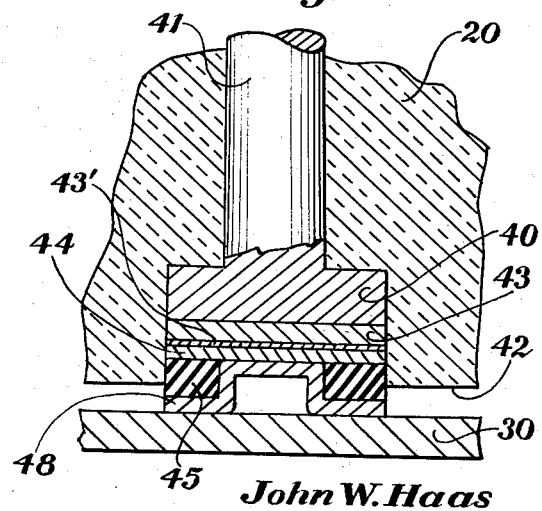
John W. Haas
Waldo B. England
INVENTORS
BY
ATTORNEYS

United States Patent Office 2,887,627
Patented May 19, 1959

2,887,627

RECTIFIER AND METHOD OF MAKING THE SAME

John W. Haas and Waldo B. England, Rochester, N.Y., assignors, by mesne assignments, to the United States of America as represented by the Secretary of the Navy Application January 9, 1953, Serial No. 330,506

2 Claims. (Cl. 317—234)

This invention relates to rectifiers and in particular to dry contact rectifiers using selenium or other materials having asymmetric conductivity.

Dry contact rectifiers are usually constructed of thin and fragile layers of base metal, semi-conductive metal and counterelectrode material which are subject to corrosion and change of electrical characteristics under humid and fungus laden atmospheric conditions and easily susceptible to abrasion in industrial applications. Where uniformity and stability of electrical characteristics is essential, it is desirable to provide a protective covering which both mechanically and chemically shields the fragile layers of the rectifier.

An object of the invention is to provide an improved means and method for enclosing and hermetically sealing dry contact rectifiers.

Another object of the invention is to provide an improved housing for a miniature dry contact rectifier which shields it from mechanical abrasion and hermetically seals it from corrosion or impairment of electrical characteristics due to humidity and fungus attack.

According to the invention a glass eyelet is molded with a metallic rod electrode sealed to and extending axially therethrough and with the electrode exposed at the lower surface thereof and also with a metallic ring, surrounding and separated from said electrode, sealed to said eyelet near the upper end thereof. A rectifier disk having successive layers of base metal, semi-conductive material, and counterelectrode metal is positioned in contact with the exposed end of the electrode and a metallic cup is fitted over the eyelet with the rectifier disk inside and in contact with the bottom of the cup. The side wall of the cup is then joined to the metallic ring to complete the hermetic sealing of the rectifier.

The scope of the invention is defined with particularity in the appended claims and preferred and alternative embodiments of the invention are illustrated in the accompanying drawing, in which:

Fig. 1 is a vertical sectional view through the preferred embodiment of the invention;

Fig. 2 is an enlarged vertical sectional view through the rectifier disk of the embodiment of Fig. 1; and Fig. 3 is an enlarged vertical sectional view through the rectifier disk of an alternative embodiment of the invention.

In the form of invention illustrated in Figs. 1 and 2, a thin aluminum disk 10 constitutes the carrier plate of the rectifier 9 and a coating 10' of a material suitable as the base metal for the semi-conductor, e.g., iron, nickel, or cobalt, is plated on the lower surface of the disk 10. On the plating of base metal 10', a layer 11 of semi-conductor material, preferably metallic selenium, is deposited. The selenium layer 11 may be rolled, pressed, or evaporated on the plated disk 10 or may be electrolytically deposited thereon from suitable electrodes. Over the selenium layer 11 is applied a layer of insulating material 14 having one or more openings 16 extending therethrough to the selenium layer. This insulating material may be an apertured plain or impregnated paper disk, but in the preferred embodiment of the invention a thin layer of varnish is applied by dipping the selenium layer in a varnish bath while clamping the selenium at the opening 16. In order to convert the selenium into the conductive crystalline modification, the carrier plate 10 with the selenium and insulating layers 11 and 14 respectively provided thereon is introduced into a furnace and heated for some time (generally 2 to 24 hours) at a temperature of about 200° C. A counterelectrode alloy 18 is then melted and poured, sprayed, evaporated, or pressed over the insulating layer 14 and through the opening 16 so as to contact the selenium layer. The counterelectrode 18 comprises a low melting point alloy such as Rose metal (50% Bi, 27.1% Pb, 22.9% Sn) or Wood's metal (50% Bi, 25% Pb, 12.5% Sn, 12.5% Cd) The barrier layer between the selenium and the counterelectrode alloy 18 is then created by electroforming in the usual manner. The counterelectrode alloy 18 penetrates the opening 16 to contact the selenium 11 in a relatively small spot which thus results in high inverse resistance characteristics. The exact determination of the size of the spot is of great importance for a number of applications, e.g., as a detector, and it is well known that the efficiency of a selenium rectifier increases with increase in resistance ratio. In an alternative embodiment of the invention, the area of the selenium layer 11 electrodeposited on the carrier plate 10 is limited by a template to control the size of the spot of contact between the selenium and the counterelectrode alloy.

The form of barrier layer hereinbefore described is well known in the art and does not constitute part of the present invention which is directed to means for hermetically sealing the barrier layer.

In the embodiment illustrated in Fig. 1 an annular glass eyelet 20 is molded with a metallic rod electrode 21 sealed thereto and extending axially therethrough so the lower surface 22 thereof is exposed. The eyelet 20 is provided with a circumferential shoulder 23 near the upper end thereof to which a metallic ring 25 is sealed. In the preferred embodiment the rod 21 and the ring 25 are both of an alloy consisting of approximately 53.7% Fe, 29% Ni, 17% Co, and 0.3% Mn and marketed commercially under the trade name "Kovar." The seal between the alloy and the glass is a chemical bond formed through a heating process in which the oxide of the alloy is dissolved into the glass. The alloy has an exceeding low coefficient of expansion which is sufficiently close to that of the glass to prevent fracturing upon cooling. Sealing of cold rolled steel or other metals to glass and similar ceramic materials is old in the art and does not constitute part of the present invention.

For ease of manufacture the glass eyelet 20 is formed, with the rod 21 and ring 25 sealed thereto, in a single operation which requires only a single heating of the glass. It is apparent, however, that the annular glass eyelet 20 can be molded in one operation and the rod 21 and the ring 25 sealed thereto in separate steps.

The base metal carrier plate 10 is welded or otherwise secured to the exposed end 22 of the rod 21. A metallic cup 30 is then pressed over the glass eyelet 20 until the counterelectrode alloy layer 18 is in contact with the inner surface of the bottom wall of the cup 30. While the glass eyelet 20 and the cup 30 are held under compression, thus clamping the rectifier disk therebetween, the upper end of the side wall 31 of the cup 30 is crimped over the upper circumferential edge 32 of the glass eyelet 20. The gap between the crimped-over edge of the side wall 31 and the ring 25 is filled with solder or other low melting point alloy 34 to hermetically seal the rectifier disk completely. The counterelectrode alloy 18 is thus held with uniform pressure against the inner bottom surface of the cup 30 in order to provide maximum stability of the electrical characteristics of the rectifier. A rod electrode 33 is welded or otherwise attached axially to the outer bottom surface of the metallic cup 30.

It will thus be seen that a miniature rectifier formed in accordance with the invention provides a simple and rugged construction which is hermetically sealed from the atmosphere to provide maximum stability of the barrier layer rectifier. In applications where a greater rectifying area is desired, the rod electrode may be headed, as by swaging, and the diameter of the rectifier disk increased accordingly.

Stability of the electrical characteristics of dry contact rectifiers is dependent to some extent upon the pressure which is maintained between the counterelectrode alloy and the layer of semi-conductive material, i.e., on the barrier layer. Fig. 3 illustrates an embodiment of the invention in which the electrical characteristics are independent of pressure. A head 40 is formed on the metallic rod electrode 41 which is of the same alloy as in the embodiment of Figs. 1 and 2. The rod electrode 41 is molded axially within a cylindrical glass eyelet 20 with the lower surface of the head 40 located inwardly and slightly above the bottom surface 42 of the glass eyelet 20. A thin aluminum disk 43 having both a coating 43' of a material suitable as the base metal for the semi-conductor and a layer 44 of semi-conductive selenium deposited thereover is welded or secured to the head 40 in exactly the same manner as in the embodiment of Figs. 1 and 2. An annular layer of insulating material 45 of the same outer diameter as the head 40 is then applied to the selenium layer and the assembly is introduced into a furnace and heated to convert the selenium to the conductive crystalline modification, again in a manner identical to that of the preferred embodiment. A layer of counterelectrode alloy 48 is then sprayed or evaporated to uniform thickness so as to cover the annular layer of insulating material 45, and the barrier layer between the selenium and the counterelectrode alloy 48 is created by electroforming in the usual manner. The counterelectrode alloy 48 penetrates the axial opening in the annular insulating layer 45 to contact the selenium in a spot the size of which is determined by the inner diameter of the annular insulating layer 45. When the cup 30 is pressed over the glass eyelet 20 and pressure is exerted to hold the latter firmly within the former, the bottom of the cup is clamped against only those portions of the counterelectrode alloy 48 above the annular insulating layer 45, and no pressure is exerted against the portion of counterelectrode alloy which contacts the selenium layer 44. It is thus seen that the pressure on the barrier layer is constant, resulting in excellent stability of the electrical characteristics of the rectifier.

We claim:

1. A hermetically sealed dry contact rectifier comprising a glass eyelet, a metallic rod electrode extending axially through and bonded to said eyelet, the face of one end of the electrode being exposed in a plane with one surface of the glass eyelet, a metallic ring surrounding and separated from said electrode and sealed to said eyelet near the end thereof opposite said one surface, a disk rectifier having successive layers of base metal, semi-conductive material, and counterelectrode material with the base metal contacting the exposed face of said electrode, and a metallic cup fitting snugly over said glass eyelet with said counter-electrode material contacting the inner surface of the plane wall thereof and with the side wall thereof sealed to said ring.

2. A hermetically sealed dry contact rectifier comprising a cylindrical glass member having a circumferential shoulder adjacent one end thereof, a metallic rod electrode having substantially the same coefficient of expansion as said glass member, extending axially through and bonded to said member, the face of one end of the electrode being exposed in the same plane as the plane surface of the other end of said glass member, a metallic ring also having substantially the same coefficient of expansion as said glass member surrounding and separated from said electrode and bonded to said member at said shoulder, a dry contact rectifier disk having successive layers of base metal, a selenium, and counterelectrode alloy positioned with the base metal in contact with the exposed face of said electrode, a metallic cup fitting snugly over said glass member with said counterelectrode alloy in contact with the inner surface of the plane wall thereof, the side wall of said cup being crimped over the shoulder of said glass member, and means for sealing the crimped-over portion of said cup to said ring.

References Cited in the file of this patent

UNITED STATES PATENTS

| | | |
|---|---|---|
| 1,826,955 | Ruben | Oct. 31, 1931 |
| 2,261,618 | Esseling | Nov. 4, 1941 |
| 2,459,788 | Bonner | Jan. 25, 1949 |
| 2,486,482 | La Brie | Nov. 1, 1949 |
| 2,577,576 | Glickman et al. | Dec. 4, 1951 |